Oct. 21, 1952          G. SLAYTER          2,614,691
SEED CLEANER AND SEPARATOR
Filed Dec. 17, 1951          2 SHEETS—SHEET 1
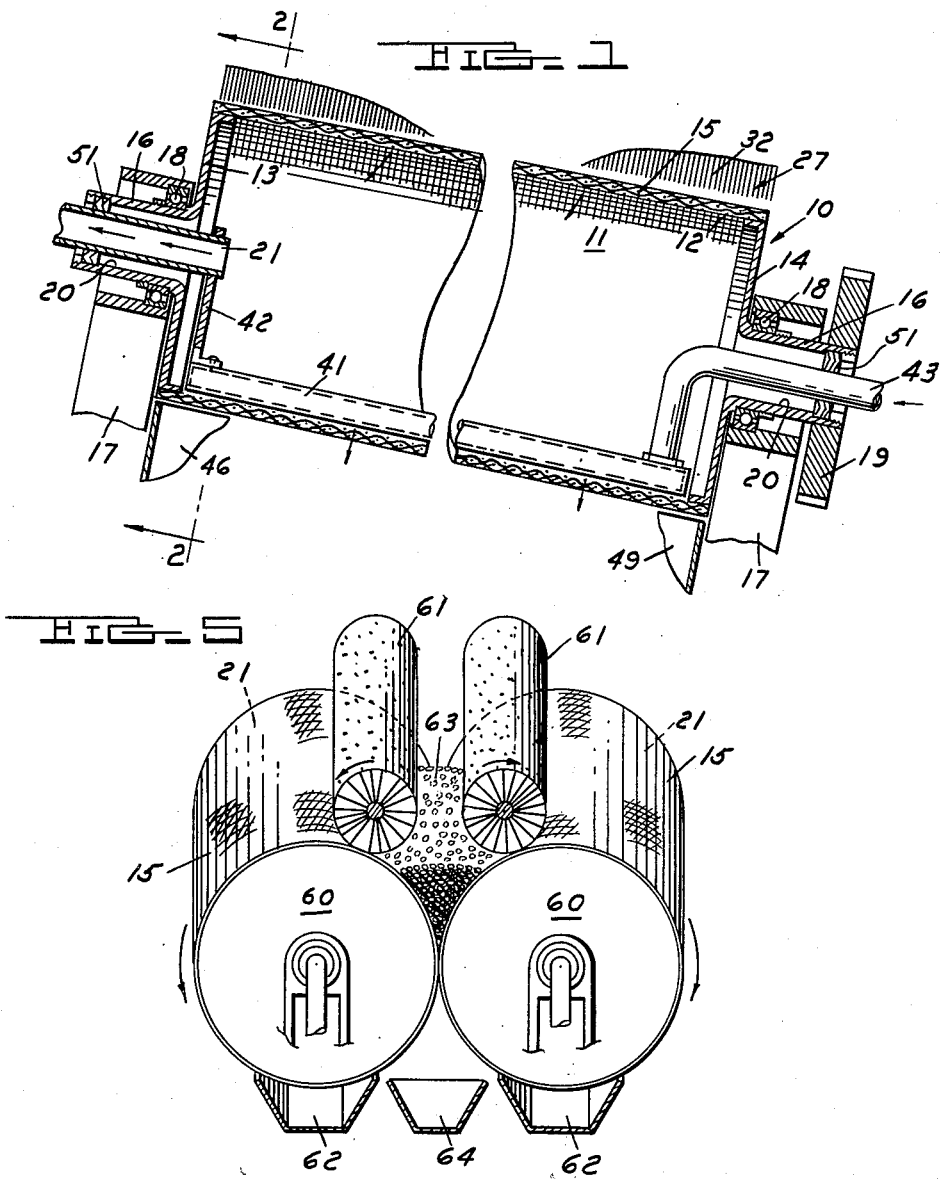
INVENTOR.
GAMES SLAYTER
BY
Whittemore, Hulbert & Belknap
ATTORNEYS

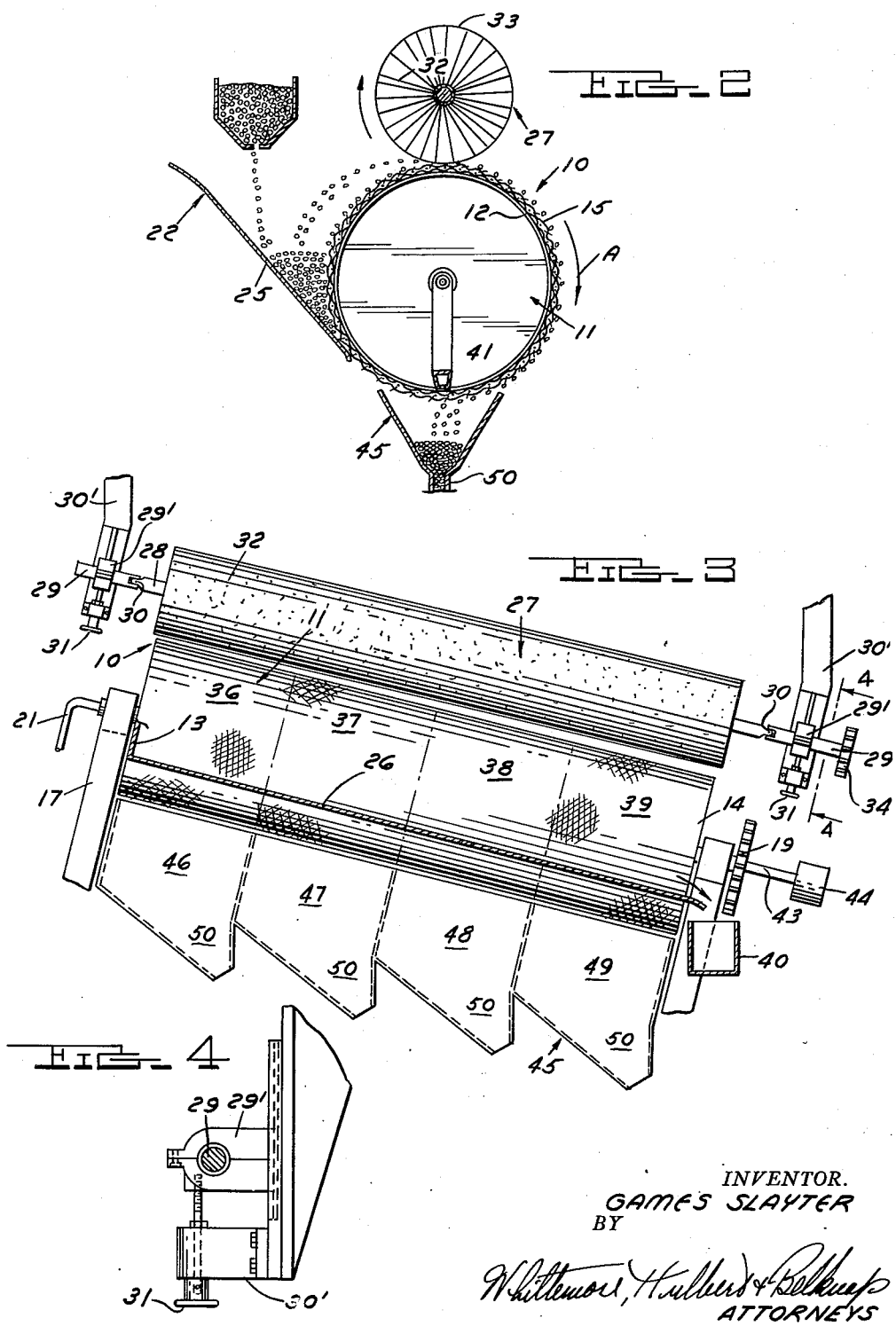

Patented Oct. 21, 1952

2,614,691

UNITED STATES PATENT OFFICE 2,614,691

SEED CLEANER AND SEPARATOR

Games Slayter, Newark, Ohio

Application December 17, 1951, Serial No. 262,087

22 Claims. (Cl. 209—91)

This invention relates generally to apparatus for cleaning seeds and for separating seeds of different sizes.

Many different types of seeds, such for example, as grass seeds, vary in size and in fact are separated from one another as well as from weed seeds according to the respective sizes of the seeds. Likewise many types of seeds are of a generally ovoid or elongated configuration, and separation of such seeds by screening processes is not satisfactory.

With the above in view it is an object of this invention to provide apparatus which separates different types of seeds according to size and accomplishes this result well within the allowable limits of accuracy at a rate considerably higher than heretofore obtainable.

It is another object of this invention to provide apparatus of the above type, which although compact in size, is capable of separating large quantities of seeds with little or no attention on the part of skilled personnel. Hence a far more accurate separation of seeds on a volume basis is obtainable at a cost considerably less than heretofore experienced with available seed separating equipment.

The foregoing as well as other objects will be made more apparent as this description proceeds, especially when considered in connection with the accompanying drawings, wherein:

Figure 1 is a semidiagrammatic longitudinal sectional view through a part of the seed separating apparatus forming the subject matter of this invention;

Figure 2 is a cross sectional view taken through the apparatus shown in Figure 1;

Figure 3 is a side elevational view of the apparatus shown in Figure 1;

Figure 4 is an enlarged sectional view taken on the line 4—4 of Figure 1;

Figure 5 is a fragmentary sectional view illustrating another embodiment of the invention.

One form of apparatus illustrating the present invention is semidiagrammatically shown in Figures 1 to 4 inclusive of the drawings, and is indicated generally by the reference numeral 10. Among the various parts of the apparatus 10 is an elongated drum 11 having a cylindrical part 12 and having end members 13 and 14.

The cylindrical part 12 may be in the form of a truly cylindrical screen or may be in the form of a cylinder having a multiplicity of small openings therethrough. Where extreme accuracy is required, it is preferred to use a metal cylinder machined or otherwise fashioned to provide a true cylindrical exterior surface and drilled or otherwise formed with the appropriate number of openings therethrough. In any case a pervious material 15 is cemented or otherwise applied to the outer cylindrical surface of the part 12. Particularly satisfactory results have been obtained by covering the cylindrical part with a fabric having a dense short pile and being sufficiently porous to enable relatively free passage of air therethrough.

The cylindrical part 12 may either be formed integral with or attached to the end members 13 and 14. Each of these members is formed with a central hub 16 coaxially arranged with respect to the axis of the drum and having openings 20 therethrough. The hubs 16 also extend outwardly from opposite ends of the drum and are journalled in a fixed support 17 by antifriction bearings 18 to enable free rotation of the drum 11 about its axis. A suitable gear 19 is secured to one of the hubs 16 and is connected to suitable driving means not shown herein for rotating the drum 11 in the direction of the arrow A (Figure 2).

It will also be noted from Figure 1 of the drawings that a conduit 21 projects axially through the hub 16 on the member 13 and communicates with the interior of the drum 11. The conduit 21 is also connected to a suction pump not shown herein, but of sufficient capacity to draw air through the material 15 into the drum 11 through the openings or perforations provided in the cylindrical part 12 of the drum.

Extending for substantially the full length of the drum at the rear side of the latter is a hopper 22. The hopper 22 may be supported on suitable fixed frame structure in any desired manner, and is open at the front side so that when installed the drum 11 actually forms the front wall of the hopper. The rear wall 25 of the hopper is inclined forwardly toward the drum 11 and the bottom edge of the wall 25 is so closely positioned relative to the periphery of the drum that the contents of the hopper is prevented from escaping through the joint. The seeds to be separated and/or cleaned are fed by any suitable means (not shown) into the hopper 22 at about the rate the seeds are processed by the apparatus.

Since the front wall or side of the hopper 22 is formed by the periphery of the drum 11 it follows that the seed is applied directly to the pervious covering 15 on the drum as the latter is rotated in the direction of the arrow A in Figure 2 of the drawings. The seed is retained on the covering material 15 by the action of air which is continuously drawn through the cylindrical part 12 of the drum.

Seed of a size larger than that specified is removed from the cylindrical part 12 of the drum upon continued rotation of the drum in the direction of the arrow A, and this is accomplished by a brush 27. The brush 27 has a length approximating the length of the drum 11, and is supported at the top of the drum 11 for rotation about an axis substantially parallel to the axis of rotation of the drum. As shown particularly in Figure 3 of the drawings, the brush has a shaft 28 and the opposite ends of the shaft are respectively connected to stub shafts 29 by universal couplings 30. The stub shafts 29 are respectively journaled in bearings 29' mounted on a support 30' for sliding movement toward and away from the drum 11 to thereby vary the clearance between the periphery of the bush 27 and the cylindrical part 12 of the drum. Accurate adjustment of the brush 27 relative to the drum 11 is obtained by suitable screws 31 rotatably mounted on the support 30' and respectively threadably engaging the bearings 29', as shown in Figure 4 of the drawings. It will be noted that the bearings 29' may be adjusted independently of one another relative to the drum 11, and this is desirable in that it enables positioning the brush 27 to provide either a uniform clearance between the periphery of the brush and the drum 11 or to provide a clearance which gradually increases from one end of the brush to the other, as shown in Figure 1 of the drawings.

The brush 27 is rotated in the same direction as the drum 11 at approximately twice the peripheral speed of the drum by suitable driving mechanism (not shown) and connected to one of the stub shafts 29 by a gear 34. In addition to the shaft 28, the brush comprises a multiplicity of relatively stiff bristles 32 which extend radially outwardly from the shaft 28 and are anchored to the shaft in any suitable manner. In any case the brush is accurately formed so that the outer ends of the bristles 32 define a cylindrical path indicated by the broken line 33 and this cylindrical path is referred to herein as the periphery of the brush.

In the preferred embodiment of the invention the axes of both the drum 11 and brush 27 are inclined downwardly as is also the hopper 22. The seeds to be separated and/or cleaned are fed into the hopper 22 at the upper end of the latter, and are accordingly advanced downwardly along the drum 11 by the action of gravity. Also the brush 27 is adjusted relative to the drum 11 so that the clearance between the drum 11 and periphery of the brush 27 gradually increases from the upper end of the drum 11 to the lower end of the drum. For the purpose of this description the length of the drum 11 is shown as divided into four zones indicated by the characters 36, 37, 38 and 39 extending lengthwise of the drum 11 from the upper end thereof. The clearance space adjacent the zone 36 may be sufficient only to permit the passage of dust particles beneath the brush 27, and if such is the case all of the seeds adhering to the drum 11 at the zone 36 are brushed off the drum 11 back into the hopper 22.

The clearance adjacent the zone 37 is somewhat greater than the clearance at the zone 36 so that fine seeds pass beneath the brush 27 and the larger or coarser seeds are brushed back into the hopper 22. The clearance adjacent the zone 38 is larger than the clearance at the zone 37 and correspondingly larger seeds pass beneath the periphery of the brush. The seeds of greater size than the clearance at the zone 38 are brushed back into the hopper 22 and are advanced downwardly along the hopper by the action of gravity. Maximum clearance is provided at the bottom of the drum 11 adjacent the zone 39 and hence very coarse seeds pass beneath the periphery of the brush 27. Any seeds adhering to the drum 11 of greater size than the clearance space at the zone 39 are brushed back into the hopper 22. The seeds remaining in the hopper 22 at the lower end of the latter drop into a collecting container 40 suitably supported directly below the lower end of the hopper 22. The seeds collected by the container 40 may be repeatedly passed through the apparatus 10 in order to extract seeds which may have escaped into the container and which are of a size less than the maximum clearance space at the zone 39. Also the seeds collected by the container 40 may be passed through a second apparatus having the same setting as or having a setting different from the apparatus 10.

The particles or seeds remaining on the drum 11 at the several zones are removed from the drum at the bottom side of the latter by air pressure. As shown in Figure 1 of the drawings, a manifold 41 is supported within the drum at the bottom side of the latter and extends for substantially the full length of the drum. One end of the manifold is attached to the inner end of the conduit 21 by a bracket 42, and the other end of the manifold is connected to a conduit 43. The conduit 43 projects axially through the hub 16 on the end member 14 and communicates with a blower 44. The bottom of the manifold is also provided with a multiplicity of air discharge openings positioned in close proximity to the bottom side of the drum in order to direct air under pressure through the cylindrical part 12 of the drum. The air is discharged from the manifold through the registering portion of the drum with sufficient force to overcome the action of suction and thereby dislodge the seeds from the bottom portion of the drum. The seeds removed from the bottom portion of the drum are collected in a trough 45 suitably supported below the drum. The trough 45 extends for the full length of the drum and is divided into four compartments 46, 47, 48, and 49 respectively registering with the zones 36, 37, 38, and 39 on the drum 11. The arrangement is such that the particles and/or seeds of a size to pass beneath the brush 27 at the top zone 36 are blown off the drum 11 into the compartment 46. The seeds of a size such as to pass beneath the brush 27 at the zones 37, 38, and 39 are blown from the drum 11 into the respective compartments 47, 48, and 49. If desired, the bottom wall of each compartment may be fashioned to form a chute 50 for conveying the particles and/or seeds into suitable bags or receptacles, not shown.

It has been stated above that the interior of the drum is subjected to the action of suction so that air is drawn through the cylindrical part 12 of the drum with sufficient force to retain seed in contact with the covering 15 on the drum. In order to increase the efficiency of air flow into the drum by the action of suction, suitable seals 51 are provided between the hubs 16 and the respective conduits 21 and 43, as shown in Figure 1 of the drawings.

Although the apparatus 10 is shown and described as having a brush 27 supported with its axis of rotation inclined relative to the axis of the drum 11 in order to provide a clearance space of progressively increasing dimension between the drum and brush, it will be understood that the brush 27 may be adjusted to a position wherein a clearance space of uniform dimension exists between the periphery of the brush and the drum 11. With such an arrangement, seeds and/or particles having a size smaller than the clearance space beneath the brush are blown off the drum into the trough and the larger seeds and/or particles are advanced along the hopper by the action of gravity to the container 40.

Apparatus of cleaning and separating seeds at an increased rate is shown in Figure 5 of the drawings. This apparatus comprises two drums 60, two brushes 61 respectively supported above the drums, and two troughs 62 respectively supported beneath the drums. The construction of the drums 60, brushes 61 and troughs 62 is the same as the drum 11, brush 27, and trough 40 previously described. The drums 60 are supported in side by side relationship with their axes in a common plane and with adjacent sides contacting to provide a space 63 above the drums 60 which serves as a hopper for seed. In the present instance the drums 60 are rotated in opposite directions in a manner such that adjacent peripheral surfaces move upwardly. Since these surfaces of the drums are in rolling contact and since they travel in an upward direction, there is very little tendency for seeds to escape or drop between the drums.

The brushes 61 are rotated in directions to brush the seeds back into the space or hopper 63, and the apparatus is tipped so that the seeds are fed downwardly in the hopper toward the collecting container 64 in the same manner described in connection with the first embodiment of this invention.

While the two forms of apparatus selected herein for the purpose of illustrating the present invention are somewhat diagrammatically shown, nevertheless it will be noted that these embodiments render it possible to readily separate seeds of different sizes regardless of the shape of the seeds. It will further be noted that the two embodiments perform this desired function at an exceptionally fast rate without the attention of skilled personnel; and hence, the cost of seed separation and cleaning is materially reduced.

It will also be understood from the foregoing that both embodiments of the invention may be satisfactorily used for separating according to size numerous different types of particles or granular substances, regardless of their particular nature. For example either or both embodiments may be employed for separating sand mica flakes in the manufacture of laminated mica to insure elimination of voids in the lamination. Hence seed separation and/or cleaning is merely one use to which the invention may be put, and the invention should not be limited to this particular use.

What I claim as my invention is:

1. Apparatus for separating particles according to size comprising a drum supported for rotation and having a particle collecting cylindrical surface through which air may pass into the drum, means for depositing particles on the cylindrical surface at one side of the drum, means for withdrawing air from the space within the drum confined by the cylindrical surface at a rate determined to hold the particles on the cylindrical surface during rotation of the drum, and means for brushing particles off the drum surface spaced from said surface a distance determined to allow particles of a selected size to pass the brushing means.

2. The apparatus defined in claim 1 wherein the cylindrical drum surface is perforated and is covered with a pervious material.

3. The apparatus defined in claim 1 wherein the brushing means comprises a brush rotatable about an axis extending in the direction of the drum axis and having the peripheral portion spaced from the cylindrical drum surface to provide clearance for particles of a specified size.

4. The apparatus defined in claim 1 having means spaced in the direction of rotation of the drum from the brush means for removing from the cylindrical surface of the drum particles which pass through the space between the cylindrical drum surface and said brushing means.

5. The apparatus defined in claim 1 having an air discharge manifold extending lengthwise of the drum within the latter and arranged to direct air under pressure outwardly through the cylindrical drum surface between the particle depositing means and brushing means for removing from the cylindrical drum surface particles which pass through the space between the cylindrical drum surface and said brushing means.

6. The apparatus defined in claim 1 having means supporting the brushing means for adjustment relative to the drum in directions to vary the clearance between the cylindrical drum surface and said brushing means.

7. The apparatus defined in claim 1 having means for rotating the brushing means in a direction to brush particles from the drum back into the particle depositing means.

8. In apparatus for separating particles according to size, a drum supported for rotation and having a particle collecting cylindrical surface through which air may pass into the drum, a hopper extending lengthwise of the drum along one side of the cylindrical surface and open adjacent the cylindrical surface to deposit particles on said surface as said drum rotates, means for drawing air through the cylindrical surface of the drum at a rate determined to hold the particles on the cylindrical drum surface, means for brushing particles off the drum surface spaced from said surface to allow particles of a selected size to pass the brushing means, and means positioned beyond the brushing means in the direction of rotation of the drum for removing from the drum surface those particles which pass through the clearance space between the drum surface and brushing means.

9. The apparatus defined in claim 8 wherein the brushing means comprises a brush extending lengthwise of the drum and rotatable in a direction to brush the particles back into said hopper.

10. The apparatus defined in claim 9 wherein the axes of the brush and drum and wherein the hopper are all inclined in a direction to cause particles in the hopper to feed along the drum by the action of gravity.

11. The apparatus defined in claim 8 wherein the brushing means comprises a brush extending lengthwise of the drum and wherein the clearance space provided between the cylindrical drum surface and the periphery of the brush progressively increases in depth lengthwise of the drum.

12. The apparatus defined in claim 11 wherein the axis of rotation of the brush is inclined with respect to the axis of rotation of the drum to provide a clearance space between the cylindrical drum surface and periphery of the brush which progressively increases in depth lengthwise of the drum surface.

13. The apparatus defined in claim 12 wherein the brush is rotated in a direction to brush back into the hopper those particles on the drum surface which are larger than the clearance space between the brush and cylindrical drum surface.

14. The apparatus defined in claim 13 wherein the axis of rotation of the brush and the axis of rotation of the drum and wherein the hopper are all inclined in a direction to cause particles in the hopper to feed by the action of gravity in a direction toward the end of the clearance space of maximum depth.

15. The apparatus defined in claim 14 comprising a collecting trough supported in a position to receive the particles removed from the cylindrical drum surface beyond said brush and having separate compartments spaced longitudinally of the drum for receiving the particles removed from adjacent portions of the drum.

16. In apparatus for separating particles according to size, a drum supported for rotation and having a particle collecting cylindrical surface through which air may pass into the drum, a hopper extending lengthwise of the drum along one side of the cylindrical surface and open adjacent the cylindrical surface to deposit particles on said surface as said drum rotates, means for drawing air through the cylindrical surface of the drum at a rate determined to hold the particles on the cylindrical drum surface, means for brushing particles off the drum surface spaced from said surface to allow particles of a selected size to pass the brushing means, means positioned beyond the brushing means in the direction of drum rotation for dislodging from the cylindrical drum surface those particles which pass through the clearance space provided between the drum and brushing means, and means for relatively adjusting the drum and brushing means to vary the clearance space therebetween.

17. The apparatus defined in claim 16 wherein the brushing means comprises a brush extending longitudinally of the drum and rotatable about an axis inclined with respect to the drum axis to provide a clearance space between the cylindrical drum surface and the periphery of the brush which varies in depth lengthwise of the drum, and wherein the brush and drum are relatively adjustable to selectively vary the depth of the clearance space and the angle of inclination of adjacent peripheral portions of the drum and brush.

18. The apparatus defined in claim 17 wherein the brush is rotatable in a direction to brush particles back into the hopper and wherein the hopper, drum and brush are all inclined in a direction to feed particles in the hopper by the action of gravity along the drum.

19. In apparatus for separating particles according to size, a pair of drums supported in side by side relationship with adjacent sides contacting to provide a hopper for particles therebetween and rotatable in directions to convey the particles out of the hopper, a pair of brushes respectively supported for rotation in positions to brush particles off the drums and having the peripheral surfaces spaced from the cylindrical drum surfaces predetermined distances to allow particles of specified sizes to pass the brushes, and means positioned beyond each brush in the direction of rotation of the adjacent drum for removing from the cylindrical drum surfaces those particles which pass through the clearance spaces provided between the drums and the respective brushes.

20. The apparatus defined in claim 19 wherein the brushes are rotated in directions to brush particles off the drum back into the hopper.

21. The apparatus defined in claim 20 wherein the clearance spaces between the respective brushes and the adjacent cylindrical drum surfaces progressively increases in depth lengthwise of the drums.

22. The apparatus defined in claim 20 wherein the axes of the brushes are inclined relative to the axes of the respective drums to provide clearance spaces between the brushes and respective drums which progressively increase in depth longitudinally of the drums, and wherein the drums and brushes are inclined in a direction to cause particles within the hopper to feed by the action of gravity along the drums toward the ends of the clearance spaces of maximum depth.

GAMES SLAYTER.

No references cited.